(12) United States Patent
Shigeta et al.

(10) Patent No.: US 6,616,352 B1
(45) Date of Patent: Sep. 9, 2003

(54) OPTICAL TRANSMISSION APPARATUS AND BIDIRECTIONAL OPTICAL SPACE TRANSMISSION SYSTEM USING THE SAME

(75) Inventors: Junji Shigeta, Utsunomiya (JP); Toshihiko Myojo, Yokohama (JP); Yasuhiro Takahashi, Ageo (JP); Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/586,883

(22) Filed: Jun. 5, 2000

(30) Foreign Application Priority Data

Jun. 10, 1999 (JP) ............................. 11-164471
Jul. 15, 1999 (JP) ............................. 11-202335

(51) Int. Cl.[7] .......................... H04B 10/00; H04B 10/04
(52) U.S. Cl. ..................... 398/156; 398/122; 398/124; 398/129; 398/183
(58) Field of Search ................. 359/117, 131, 359/158, 159, 153, 161, 162

(56) References Cited

U.S. PATENT DOCUMENTS 5,030,004 A * 7/1991 Grant et al. ............... 356/153
5,142,400 A * 8/1992 Solinsky ................... 359/159
5,917,634 A * 6/1999 Otobe ....................... 359/172
6,323,980 B1 * 11/2001 Bloom ...................... 359/159

* cited by examiner

Primary Examiner—Leslie Pascal
Assistant Examiner—Dalzid Singh
(74) Attorney, Agent, or Firm—Fitzpatrick, Cella, Harper & Scinto

(57) ABSTRACT

A bidirectional optical space transmission system is made up of a pair of optical transmission apparatus. Each optical transmission apparatus comprises a signal generating circuit for generating a pilot signal, a multiplexing section for multiplexing the pilot signal and a main signal to be transmitted, an electrooptic converter section for emitting an optical signal on the basis of the signal produced by the multiplexing process, a light receiving element for receiving an optical signal transmitted from the partner optical transmission apparatus and detecting a pilot signal contained therein, and a demodulation circuit for demodulating the pilot signal detected by the light receiving element. Pilot signals multiplexed with main signals to be transmitted through the bidirectional optical transmission system are subjected to spreading modulation and demodulated for spreading by the demodulation circuit.

12 Claims, 8 Drawing Sheets

OPTICAL TRANSMISSION APPARATUS AND BIDIRECTIONAL OPTICAL SPACE TRANSMISSION SYSTEM USING THE SAME

BACKGROUND OF THE INVENTION

1. Field of the Invention

This invention relates to an optical transmission apparatus adapted to emit and receive a light beam modulated as a function of the information it carries. The present invention also relates to a bidirectional optical space transmission system comprising a pair of such optical transmission apparatus that are arranged at the opposite ends of a transmission path having a predetermined distance in order to bidirectionally transmit information.

2. Related Background Art

In optical space transmission systems comprising a pair of optical transmission apparatus arranged at the opposite ends of a transmission path, a signal to be transmitted is modulated into an optical signal by the transmission apparatus operating as signal sender and then a light beam carrying the optical signal is emitted to the other transmission apparatus operating as signal receiver. The emitted light beam is transmitted through the atmosphere and received by the transmission apparatus operating as signal receiver at the other end of the transmission path, which apparatus then demodulates the optical signal transmitted from the signal sender to complete the signal transmission through the atmosphere.

However, the transmission path of the light beam emitted from the optical transmission apparatus can be fluctuated by atmospheric disturbances. Additionally, the optical transmission apparatus can become deformed, if slightly, due to its temperature changes particularly when the apparatus is arranged on the roof of a building. Then, the direction in which it emits the light beam can be slightly shifted. If the transmission path of the light beam is shifted due to any of such external causes before the light beam gets to the signal receiver, the energy level of the signal received by the optical transmission apparatus operating as signal receiver is reduced and the signal transmission can be interrupted in worst cases.

Currently, such problems are avoided by making the light beam coming from the signal sender show a large beam diameter at the receiving apparatus and/or by using a high optical output level at the sending apparatus so that the receiving apparatus can receive the signal with a sufficient energy level.

However, the energy level of the optical signal transmitted from an optical transmission apparatus is limited in order to protect people from adverse effects of light beams and hence there may be occasions where the optical transmission apparatus cannot emit a light beam with a satisfactory energy level. In view of these circumstances, there have been devised bidirectional optical space transmission systems having an automatic tracking feature. With such a system, the optical transmission apparatus operating as signal sender is provided with a function of correcting the error, if any, in the angle of emitting the light beam so that the light beam may reliably get to the effective reception area of optical transmission apparatus operating as signal receiver if the diameter of the light beam is minimized at the receiving apparatus.

FIG. 1 of the accompanying drawings schematically illustrates the configuration of a known optical transmission apparatus used in a bidirectional optical space transmission system. Referring to FIG. 1, when transmitting a signal, the optical transmission apparatus multiplexes a pilot signal (auxiliary signal) output from its pilot signal generator 2 and a main signal input to its main signal input section 1 from an external signal source such as a computer by means of its multiplexing section 3. The pilot signal is designed to correct the error in the angle with which the optical transmission apparatus emits a light beam from it for the main signal. A sinusoidal wave signal that is a narrow band signal is typically used for such a pilot signal.

The signal produced from the multiplexing section 3 is then transformed into an optical signal by electrooptic converting section 4 and the light beam carrying the optical signal is collimated by collimator lens 5 before it is transmitted to the optical transmission apparatus operating as signal receiver by way of beam splitter 6, light beam transmission angle modifying section 7 and a group of lenses 8.

The optical transmission apparatus operating as signal receiver has also the configuration illustrated in FIG. 1. The light beam carrying the optical signal and transmitted from the signal sender is taken into the apparatus by means of a group of lenses 8. The light beam is then reflected by beam splitter 6 by way of light beam transmission angle modifying section 7 and its optical path is separated from the optical path of the light beam emitted from electrooptic converting section 4. Then, the main signal and the pilot signal carried by the light beam that is reflected by the beam splitter 6 are then separated from each other by beam splitter 9 and the main signal is transmitted through the beam splitter 9 and converted into an electric signal by signal receiving section 10, which electric signal is then output from main signal output section 11, while the pilot signal is reflected by the beam splitter 9 and detected by light beam transmission angle error detecting section 12. Then, light beam transmission angle modifying section 7 is driven by angle of optical axis regulating drive control section 13 to correct the angle of emission of the light beam being transmitted at the start of and during the operation of the system.

Thus, in the known bidirectional optical space transmission system, the optical axis of the signal transmitting section and that of the signal receiving section are made to agree with each in each optical transmission apparatus so that the apparatus may detect and correct the relative angular error between the optical axis of the light beam it receives from the signal transmitting apparatus and that of its own signal receiving section. With such a regulating operation conducted at the opposite ends of the signal transmission path, each of the optical transmission apparatus can emit a light beam for signal transmission with its optical axis agreeing with that of the light beam emitted from the apparatus at the other end of the transmission path to reliably realize a bidirectional optical space transmission scheme.

In a bidirectional optical space transmission system adapted to regulate the angle of emission of the light beam being transmitted, the optical transmission apparatus transmitting a signal generally multiplexes a pilot signal and a main signal. Since the pilot signal is a narrow band signal if compared with the main signal, it can be detected with a high S/N ratio if the signal strength is weak. In other words, if the optical signal becomes weak and the main signal can no longer provide a required signal quality, the pilot signal can operate properly and maintain its quality control function even when its signal level is by far lower than that of the main signal. Additionally, the influence of background light can be reduced by detecting the angular error not directly by way of the light beam but by way of the pilot signal.

However, in known bidirectional optical space transmission systems having a configuration as described above, there arises a problem as pointed out below when a plurality of optical transmission apparatus are arranged adjacently in parallel at each of the opposite ends of the transmission path so that pairs of apparatus may exchange information independently between the opposite ends of the transmission path. If the power supply breaks down and is restored or the optical axis of the signal transmitting section and that of the signal receiving section are turned disagreeing with each other by violent vibrations or for some other cause, the apparatus can try to correct the relative angular error between the optical axis of its own signal receiving section and that of the light beam of a wrong signal transmitting apparatus at the other end of the transmission path because the apparatus does not have any means for identifying the right signal transmitting apparatus.

On the other hand, while "the pilot signal can operate properly and maintain its quality control function even when its signal level is by far lower than that of the main signal" as described above, the output level of the pilot signal is nevertheless subject to a certain lower limit and cannot be made too low because the automatic tracking function using the pilot signal has to be secured if the quality of the transmission path is degraded and the main signal can no longer be transmitted.

A quadripartite photosensor is normally used for the automatic tracking function as means for detecting the spot of arrival of the light beam transmitted from the optical transmission apparatus at the other end of the transmission path. However, since the quadripartite photosensor is less sensitive to higher frequencies, a relatively low frequency band has to be used for the pilot signal. Then, a frequency band higher than that of the pilot signal has to be selected for the main signal and multiplexed with the latter frequency band to realize frequency-division multiplexing.

In terms of this problem, optical transmission apparatus adapted to frequency multiplexing of an analog signal having a wide frequency band such as a video signal after a certain preliminary modulation process such as frequency modulation are currently being marketed. However, such optical transmission apparatus are accompanied by a drawback of generating intermodulation distortion waves in the modulated frequency band of the video signal that consequently degrades the quality of signal transmission because of the non-linearity of the system due to the low frequency band of the pilot signal.

For instance, the video signal subjected to a frequency modulation process shows a spectrum that is by far broadened if compared with the spectrum of the base band. Therefore, the frequencies of the carrier waves of the pilot signal and the video signal have to be altered for frequency multiplexing so that the frequency bands of the two signals may not overlap each other. Additionally, because a low frequency band has to be selected for the pilot signal to be used for the automatic tracking function from the viewpoint of the performance of the sensor to be used for the function, the frequency arrangement of the optical transmission apparatus may typically be such as the one illustrated in FIG. 2A, where fp indicates the frequency of the pilot signal and fc1 and fc2 indicate the frequencies of the carrier waves to be used for signals P1 and P2 obtained by modulating the video signal.

The signals having such a frequency arrangement are transformed into optical signals by the electrooptic converter and then transmitted into the air. Then, the signal receiving optical transmission apparatus transforms the optical signals back into the original electric signals by means of its optoelectric converter, which signals are then subjected to respective signal processing operations. Thus, the signals are subjected to a variety of processing operations during the period from the time when they are multiplexed in the signal transmitting optical transmission apparatus to the time when they are isolated from each other in the signal receiving optical transmission apparatus as shown in FIG. 2A. If non-linear or not perfectly linear factors are involved in these operations, distortions x can be produced in the signals to generate one or more than one unnecessary signals in the signal band to consequently degrade the signal quality. For instance, distorted waves may be generated at the both sides of frequency fc1 and those of frequency fc2 with intervals equal to frequency of fp as shown in FIG. 2B. Then, a beat noise can appear in the transmitted video signal if the latter is an analog signal.

If, on the other hand, the optical transmission path is used for the transmission of digital data and a light beam is directly modulated by the digital data, the base band spectrum is lopsided to a lower frequency zone as shown in FIG. 3 to make it difficult to isolate it from the frequency band of the pilot signal. While the pilot signal and the proper signal may be subjected to frequency multiplexing by suppressing the amplitude of the pilot signal to such an extent that it may not adversely affect the proper signal, then the pilot signal can be affected by the proper signal to degrade the automatic tracking function of the transmission system.

Thus, the spectrum of the proper signal has to be shifted to a frequency band higher than that of the pilot signal in order to prevent them from overlapping each other and the digital data has to be preliminarily modulated in advance typically by phase-shift keying for the purpose of frequency multiplexing. However, this technique inevitably makes the overall signal processing system for transmitting digital data at high speed a very complex one.

SUMMARY OF THE INVENTION

Therefore, it is an object of the present invention to provide an optical transmission apparatus and a bidirectional optical space transmission system using such apparatus that are free from the above problems and adapted to identify the partner apparatus out of a plurality of apparatus located at the other end of the transmission path so that the optical transmission apparatus may correct any angular error between the optical axis of the light beam it receives from the signal transmitting apparatus at the other end of the transmission path and that of its own signal receiving section.

Another object of the present invention is to provide an optical transmission apparatus and a bidirectional optical space transmission system using such apparatus that are free from the above problems and have an improved automatic tracking performance to minimize the adverse effect that the proper signal being transmitted may suffer.

According to the invention, the above objects and other objects of the invention are achieved by providing an optical transmission apparatus comprising:

a signal generating circuit for generating an auxiliary signal modulated for spectral spreading;

a multiplexing section for multiplexing the auxiliary signal generated by the signal generating circuit and a main signal;

an electrooptic converter section for emitting an optical signal on the basis of the signal produced by the multiplexing section as a result of the multiplexing;

a light receiving element for receiving an optical signal transmitted from a partner optical transmission apparatus and detecting an auxiliary signal contained in the optical signal and modulated for spectral spreading; and a demodulation circuit for spreading demodulation of the auxiliary signal detected by the light receiving element.

According to the invention, there is also provided a bidirectional optical space transmission system comprising a pair of optical transmission apparatus according the invention and separated from each other by a predetermined distance.

DETAILED DESCRIPTION OF THE PREFERRED EMBODIMENTS

Now, the present invention will be described by referring to the accompanying drawings that illustrate preferred embodiments of the invention.

Figure 4:
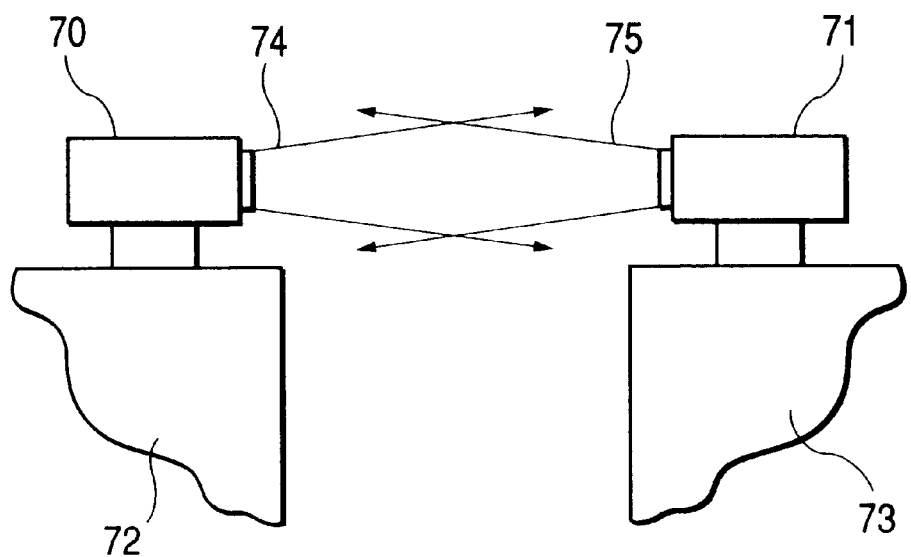
FIG. 4 is a schematic block diagram of an embodiment of bidirectional optical space transmission system according to the invention.

FIG. 4 is a schematic block diagram of an embodiment of bidirectional optical space transmission system according to the invention. Referring to FIG. 4, the bidirectional optical space transmission system comprises a pair of optical transmission apparatus 70 and 71 that are separated from each other by a predetermined distance. The optical signal 74 transmitted from the optical transmission apparatus 70 is received by the other optical transmission apparatus 71 and the information contained in the signal is read by the latter. On the other hand, the optical signal 75 transmitted from the optical transmission apparatus 71 is received by the optical transmission apparatus 70 and the information contained in the signal is read by the latter. Thus, signals can be transmitted bidirectionally in the system. The optical transmission apparatus 70 and 71 may be arranged on top of buildings 72 and 73 respectively.

Figure 5:
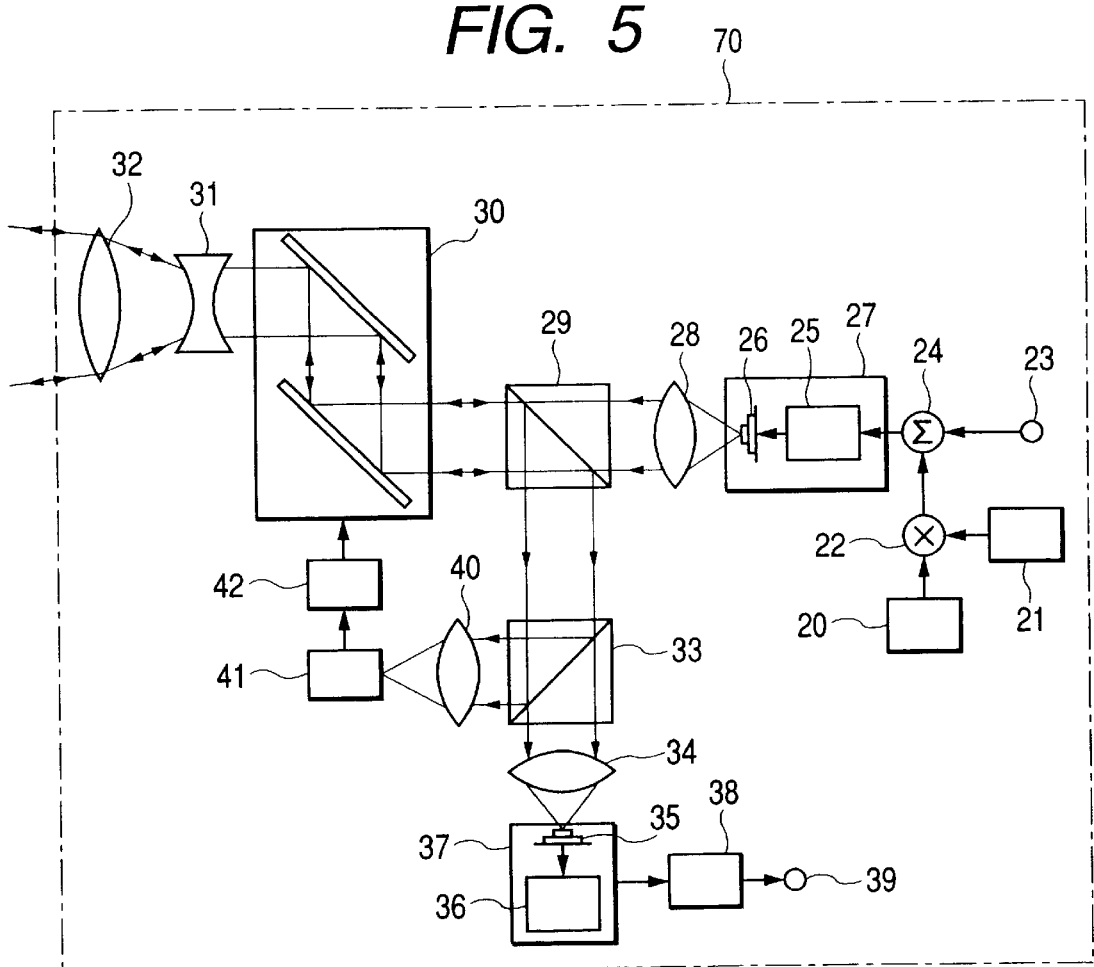
FIG. 5 is a schematic block diagram of an embodiment of optical transmission apparatus that can be used in the system of FIG. 4.

FIG. 5 is a schematic block diagram of an embodiment of optical transmission apparatus that can be used for the optical transmission apparatus 70 (or 71 because both of the optical transmission apparatus 70 and 71 have a same and identical configuration) in the system of FIG. 4. Referring to FIG. 5, the apparatus comprises an auxiliary signal generating section 20 for generating an auxiliary signal (pilot signal) that is used by the other optical transmission apparatus 71 to detect the signal reception level, a pseudonoise generating section 21 for generating a sequence of pseudonoises that is used as a spreading code and a spreading modulator section 22 for modulating the auxiliary signal for spectral spreading that is connected to both the auxiliary signal generating section 20 and the pseudonoise generating section 21 so that the output of the auxiliary signal generating section 20 and that of the pseudonoise generating section 21 are input to the spreading modulator section 22.

The embodiment additionally comprises a main signal input section 23 where a main signal to be transmitted to the optical transmission apparatus located at the other end of the transmission path is input and a multiplexing section 24 connected to both the spreading modulator section 22 and the main signal input section 23 so that the output of the spreading modulator section 22 and that of the main signal input section 23 are multiplexed by the multiplexing section 24. The multiplexing section 24 is further connected to electrooptic converter section 27 so that the output of the multiplexing section 24 is input to the electrooptic converter section 27, which may typically comprises a laser drive circuit 25 and a laser diode 26 and is adapted to convert the electric signal input to it into an optical signal.

A lens 28, a polarization beam splitter 29 for isolating the light beam to be transmitted and the received light beam from each other, a light beam transmission angle modifying section 30 and lenses 31 and 32 are arranged along the optical path of the light beam emitted from the laser diode 26. The light beam that is reflected by the polarization beam splitter 29 is made to proceed through another beam splitter 33 for splitting the beam into a main signal and a signal to be used for detecting the relative angular error between the light beam emitted from the apparatus 70 and the light beam emitted from the apparatus 71, a lens 34 and an optoelectric converter section 37. The optoelectric converter section 37 may typically comprise a light receiving element 35 and a light receiving circuit 36 and is adapted to convert the optical signal input to it into an electric signal. The light receiving circuit 36 is connected to main signal output section 39 by way of a demodulator section 38 for demodulating the main signal transmitted from the optical transmission apparatus located at the other end of the transmission path. Thus, the demodulated signal is output from the main signal output section 39. The light beam that is reflected by the beam splitter 33 is made to proceed through a lens 40 and a light beam transmission angle error detecting section 41. The output of the light beam transmission angle error detecting section 41 is connected to the input of optical axis angle regulating drive control section 42, which optical axis angle regulating drive control section 42 controls the light beam transmission angle modifying section 30.

Figure 6:
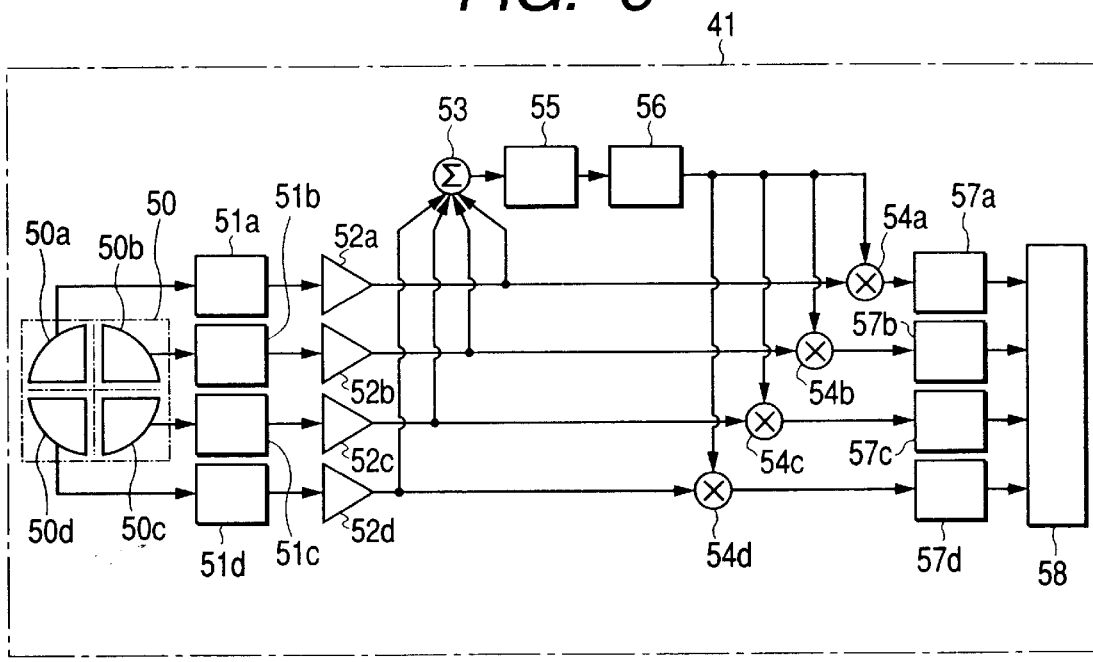
FIG. 6 is a schematic circuit diagram of the light beam transmission angle error detecting section of the embodiment of optical transmission apparatus of FIG. 5.

FIG. 6 is a schematic circuit diagram of the light beam transmission angle error detecting section 41 of the embodiment of optical transmission apparatus of FIG. 5. Referring to FIG. 6, the light beam transmission angle error detecting section 41 comprises a quadripartite light receiving element 50 adapted to divide the optical signal transmitted from the optical transmission apparatus located at the other end of the transmission path and containing an auxiliary signal (pilot signal) and generate a corresponding electric currents The surface of the light receiving element 50 is divided into four light receiving planes 50*a*, 50*b*, 50*c* and 50*d*. The outputs of the light receiving planes 50*a*, 50*b*, 50*c* and 50*d* are input to amplifiers 52*a*, 52*b*, 52*c* and 52*d* by way of current/voltage converters 51*a*, 51*b*, 51*c* and 51*d* respectively. The outputs of the amplifiers 52*a*, 52*b*, 52*c* and 52*d* are connected to the inputs of spreading demodulators 54*a*, 54*b*, 54*c* and 54*d* respectively and also to the input of the multiplexing section 53. The outputs that are input to the multiplexing section 53 are multiplexed by the latter.

The output of the multiplexing section 53 is input to synchronizing section 55 for detecting a synchronizing signal. Then, the sequence of pseudonoises that is used as a spreading code are output from pseudonoise generating section 56 in synchronism with the received signal according to the synchronizing signal detected by the synchronizing section 55. The sequence of pseudonoises output from the pseudonoise generating section 56 is input to the spreading demodulators 54*a* through 54*d*.

The spreading demodulators 54*a* through 54*d* carries out respective operations of spreading demodulation on the outputs of the amplifiers 52*a* through 52*d*. The signals demodulated by the spreading demodulators 54*a*, 54*b*, 54*c* and 54*d* are input to light beam transmission angle error analysing section 58 by way of respective bandpass filters 57*a*, 57*b*, 57*c* and 57*d*, which light beam transmission angle error analysing section 58 detect the angular error of the transmitted light beam on the basis of these signals. Then, the angle of optical axis regulating drive control section 42 illustrated in FIG. 5 controls the light beam transmission angle modifying section 30 on the basis of the angular error detected by the light beam transmission angle error analysing section 58.

Figure 7:
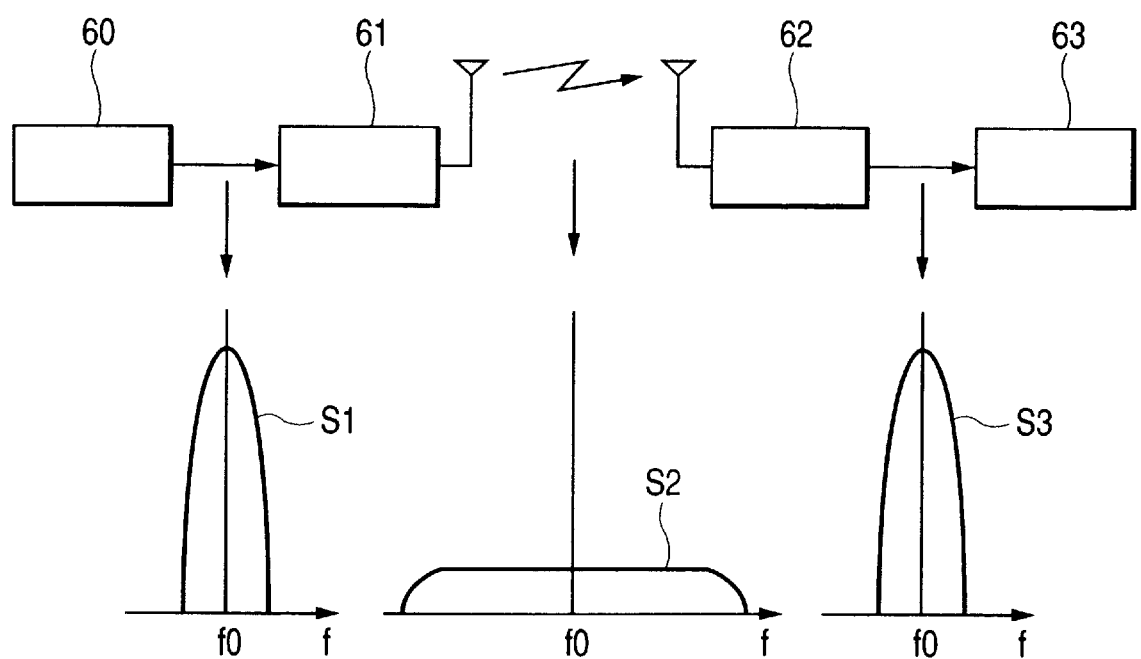
FIG. 7 is a schematic illustration of a spectral spreading system.

FIG. 7 is a schematic illustration of a spectral spreading system that can be used for the purpose of the present invention. A spectral spreading system is a system for optically transmitting information not by using a bandwidth minimally necessary for transmitting information but by intentionally using a much broader bandwidth. In popular terms, a spectral spreading system may be a direct sequence system adapted to modulate the carrier wave by means of a digital code sequence that proceeds much faster than the band of the information signal or a frequency hopping system adapted to discontinuously shift the carrier frequency according to a pattern that is determined by a code sequence.

In the case of a direct sequence system, the transmitter side of the apparatus is provided with a primary modulator section 60 for carrying out an operation of primary modulation and a secondary modulator section 61 for carrying out an operation of secondary modulation that is an operation of spreading modulation for broadening the bandwidth of signal S1 that is already subjected to primary modulation. On the other hand, the receiving side of the apparatus is provided with a secondary demodulator section 62 for carrying out an operation of spreading demodulation, or inverse spreading, on signal S2 that is subjected to spreading modulation and a primary demodulator section 63 for carrying out an ordinary operation of demodulation on signal S3 that is subjected to inverse spreading.

Thus, the auxiliary signal produced by the auxiliary signal generating section 20 in FIG. 5 is subjected to spreading modulation in the spreading modulator section 22, using a sequence of pseudonoises sent from the pseudonoise generating section 21. The auxiliary signal that is subjected to spreading modulation is then multiplexed with the main signal coming from the main signal input section 23 in the multiplexing section 24 and transformed into an optical signal by the electrooptic converter section 27 before it is transmitted by way of the lens 28, the polarization beam splitter 29, the light beam transmission angle modifying section 30 and the lenses 31 and 32 to the partner optical transmission apparatus located at the other end of the transmission path.

On the other hand, the light beam transmitted from the partner optical transmission apparatus located at the other end of the transmission path is made to pass through the lenses 31 and 32, the light beam transmission angle modifying section 30 and reflected by the polarization beam splitter 29 so that it is isolated from the light beam to be transmitted. The received light beam reflected by the polarization beam splitter 29 is then divided by the beam splitter 33 into a part that is received by the optoelectric converter section 37 by way of the lense 34 in order to detect the main signal and the remaining part. Then, this part of the received light beam is converted into an electric signal by the optoelectric converter section 37 and the main signal is demodulated in the demodulator section 38 on the basis of the obtained electric signal. The demodulated main signal is then output from the main signal output section 39.

Meanwhile, the remaining part of the received light beam from the beam splitter 33 is sent to the light beam transmission angle error detecting section 41 by way of the lens 40 to detect the light beam transmission angle error. The light beam is then received by the quadripartite light receiving element 50 arranged in the light beam transmission angle error detecting section 41 for detecting the light beam transmission angle error. The light beam is divided into four parts by the quadripartite light receiving element 50 to generate electric currents that correspond to the powers of light received by the light receiving planes 50*a* through 50*d* respectively. The generated electric currents are then converted into respective voltage signals by the current/voltage converters 51*a* through 51*d*, which voltage signals are amplified by the respective amplifiers 52*a* through 52*d*. The amplified voltage signals are then multiplexed by the multiplexing section 53 and synchronized by the synchronizing section 55 so that they may be multiplexed with a sequence of pseudonoises identical with the one multiplexed with the electric signal in terms of phase and timing. Then, the pseudonoise generating section 56 outputs a sequence of pseudonoises identical with that of the transmitter side in synchronism with the received signal, which sequence of pseudonoises is input to the spreading demodulators 54*a* through 54*d*. The spreading demodulators 54*a* through 54*d* carry out an operation of spreading demodulation on the respective outputs of the amplifiers 52*a* through 52*d*, using the input sequence of pseudonoises.

This embodiment uses a spectral spreading system for transmitting an auxiliary signal. More specifically, at the transmitter side, the operation of primary modulation is conducted in the primary modulator section 60 by means of an ordinary modulation technique such as phase-shift keying (PSK) or frequency-shift keying (FSK) and then the operation of secondary modulation is conducted in the secondary modulator section 61 by means of a technique of spreading modulation to broaden the band of the primary modulation as shown in FIG. 7. At the receiver side, on the other hand, the operation of spreading demodulation, or inverse spreading, is conducted in the secondary demodulator section 62 on the signal that is subjected to spreading modulation. The signal subjected to inverse spreading substantially recover the form obtained when it is subjected to primary modulation at the transmitter side. Thus, the signal is finally demodulated in the primary demodulator section 63 in an ordinary manner.

The electric signals that are subjected to spreading demodulation in the spreading demodulator sections 54a through 54d of FIG. 6 are then input to the light beam transmission angle error analysing section 58 by way of respective bandpass filters 57a through 57d. The light beam transmission angle error is analysed in the light beam transmission angle error analysing section 58 on the basis of the input electric signals and the obtained information on the light beam transmission angle error is sent to the optical axis angle regulating drive control section 42. The optical axis angle regulating drive control section 42 corrects the angle of optical axis of the transmitted light beam by driving the light beam transmission angle modifying section 30 on the basis of the obtained information on the light beam transmission angle error.

Figure 8A:
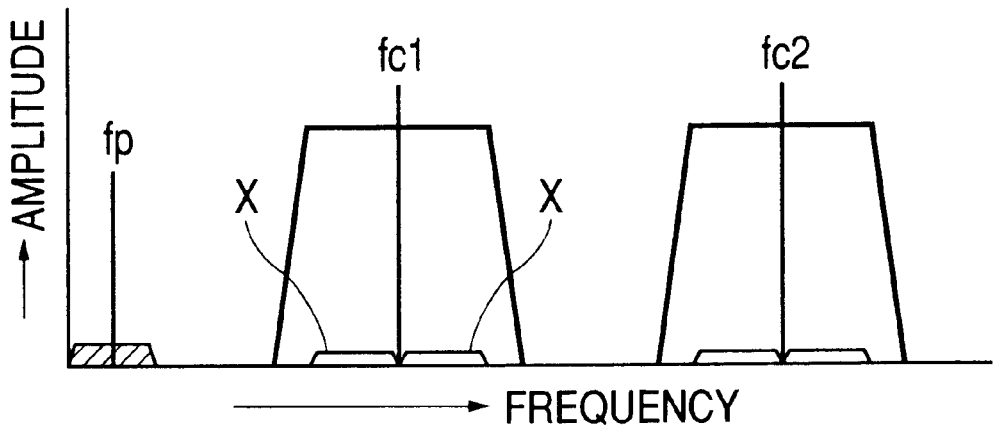
FIGS. 8A and 8B are graphs showing the spectrum of an optical signal that is modulated for spectral spreading and can be transmitted by an optical transmission apparatus according to the invention.
Figure 8B:
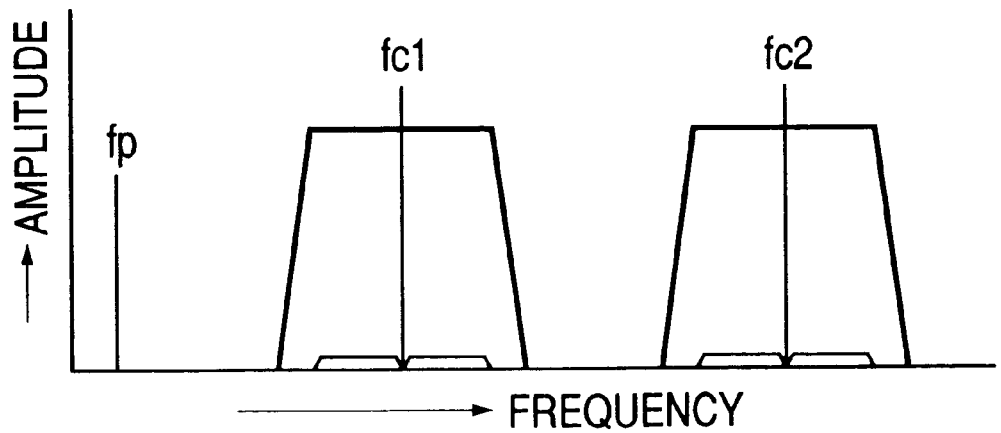

When an analog signal having a broad bandwidth such as a video signal is subjected to frequency multiplexing for transmission, the auxiliary signal (pilot signal) is subjected to spectral spreading so that the main signal and the auxiliary signal are arranged in a manner as shown in FIG. 8A. As a result, the distorted waves generated in zones that are not perfectly linear also appear so that no sharp spectrum will be produced and simply the S/N ratio will be degraded to a certain extent. Then, no visually remarkable beat noise will arise. Therefore, the spread auxiliary signal (pilot signal) will appear as shown in FIG. 8B when the original form is recovered. The auxiliary signal (pilot signal) having the recovered from is then extracted by a band-pass filter with a narrow band and subjected to signal detection and signal processing.

Figure 1:
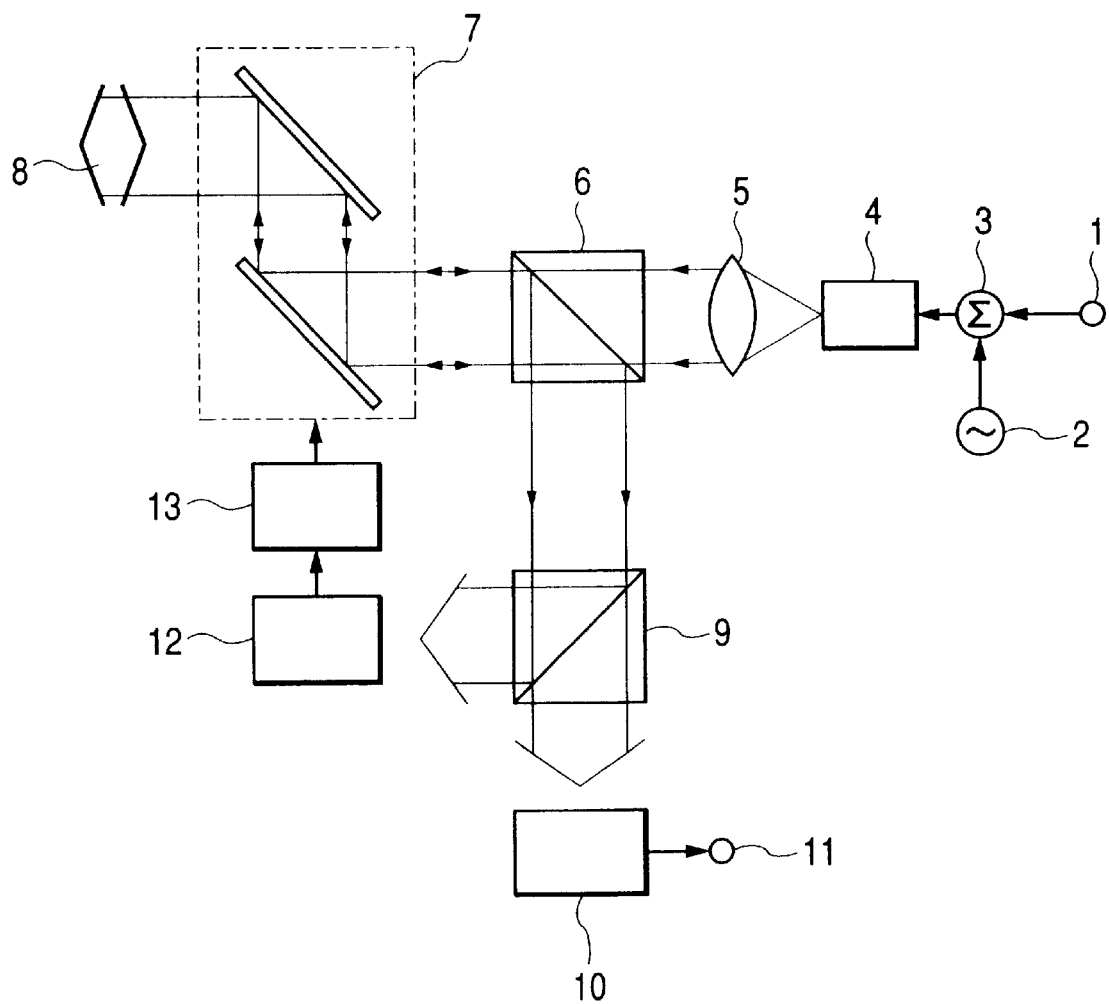
FIG. 1 is a schematic block diagram of a known optical transmission apparatus.
Figure 2A:
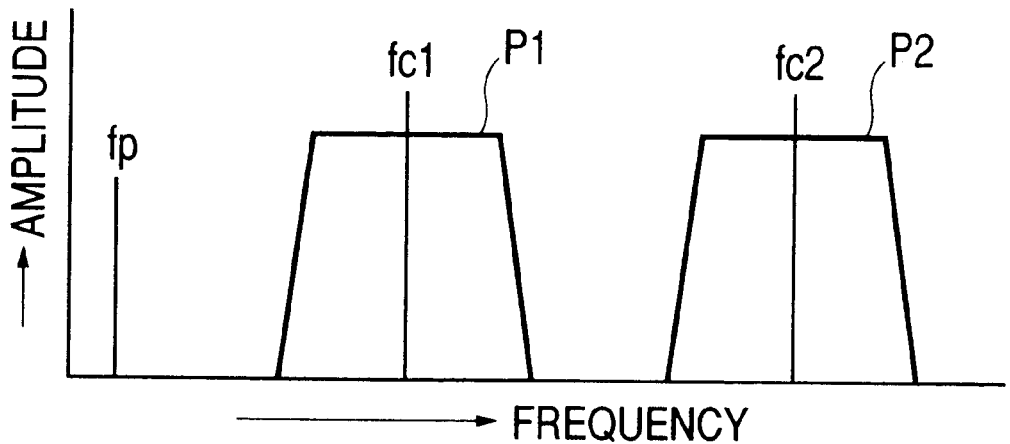
FIGS. 2A and 2B are graphs showing the spectrum of an optical signal that can be transmitted by a known optical transmission apparatus, the signal being shown particularly in terms of signal amplitude.
Figure 2B:
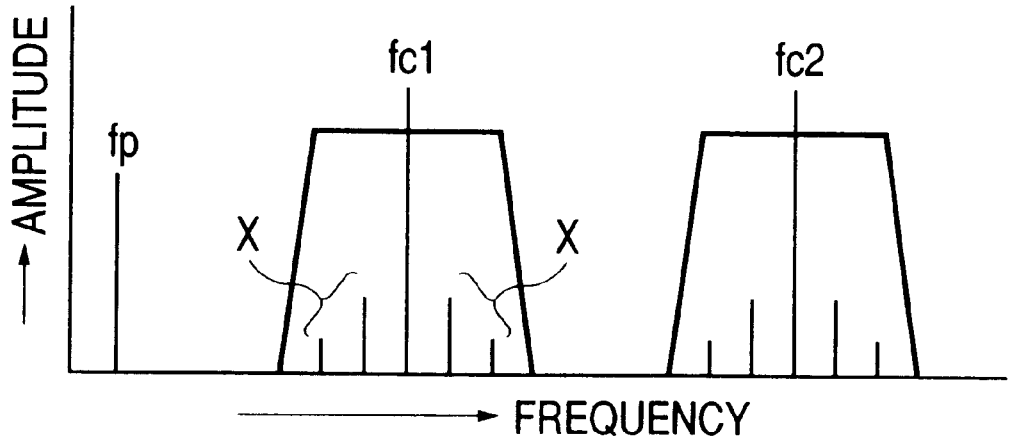
Figure 3:
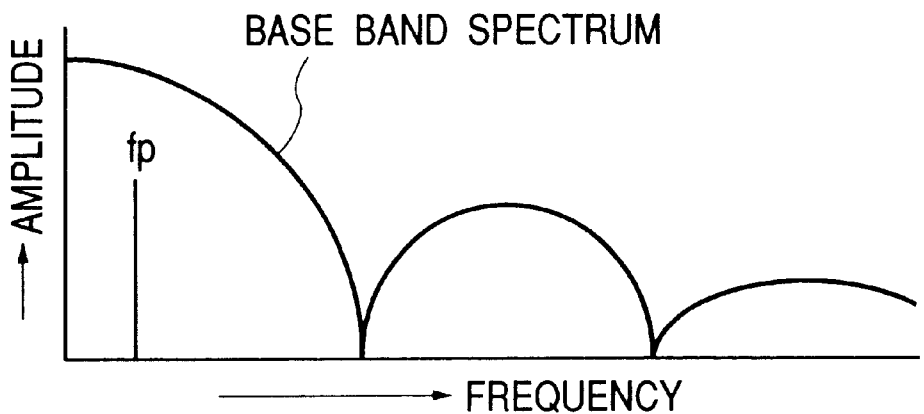
FIG. 3 is a graph showing the spectrum of another signal that can be transmitted by a known optical transmission apparatus, the signal being shown particularly in terms of signal amplitude.
Figure 9A:
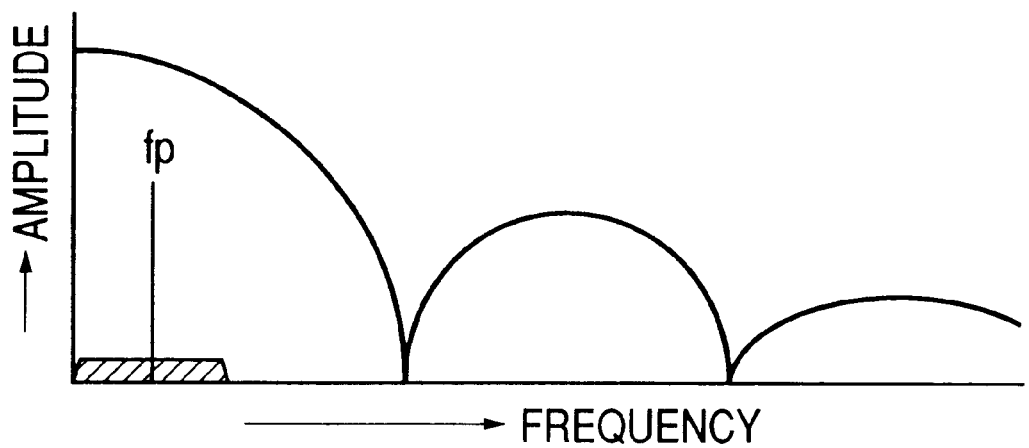
FIGS. 9A and 9B are graphs showing the spectrum of another optical signal that is modulated for spectral spreading and can be transmitted by an optical transmission apparatus according to the invention.
Figure 9B:
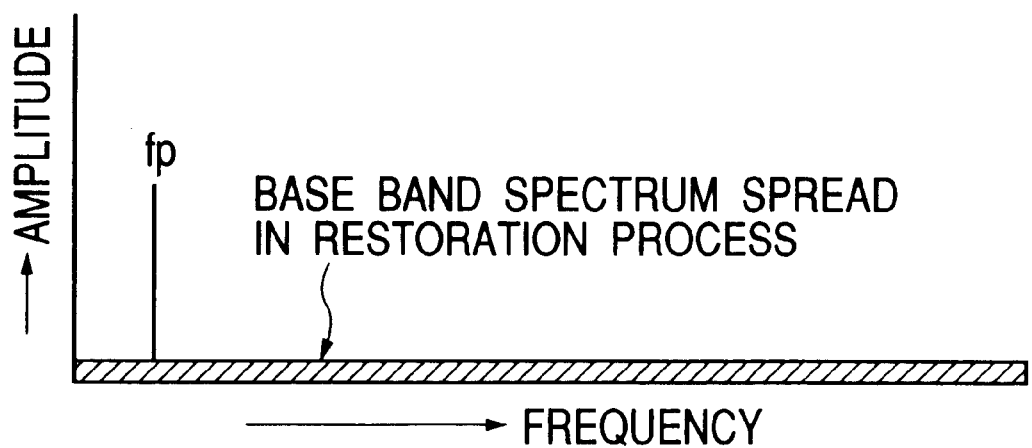

If, on the other hand, a digital data signal is transmitted by using a direct brightness modulation system, the auxiliary signal (pilot signal) is subjected to spectral spreading as shown in FIG. 9A and multiplexed with the main signal as digital data signal. As a result, the auxiliary signal (pilot signal) is regarded by the main signal as noise having little to do with the main signal so that the influence of the auxiliary signal (pilot signal) on the main signal is minimized if compared with the known technique described above by referring to FIG. 3. On the other hand, while the main signal lies partly over the spread band of the auxiliary signal (pilot signal) from the viewpoint of the latter, the main signal is spread in a manner as shown in FIG. 9B during the process of inverse spreading, which is a process of restoring the auxiliary signal, so that the latter can be extracted with ease. Since the restored auxiliary sign (pilot signal) can be made to show a high S/N ratio, it can be multiplexed with the main signal without sacrificing the automatic tracking function.

As described above, by spreading the spectrum of the auxiliary signal (pilot signal) at the transmitter side to reduce the spectral density thereof before frequency multiplexing the auxiliary signal with the main signal, the distorted waves that arise due to the non-linearity of the system are also spread and become less harmful to the main signal. More specifically, the spectral density can be reduced by using the spectral spreading system for spreading the auxiliary signal (pilot signal) so that the latter signal is allowed to coexist with the main signal in a same band without requiring the operation of preliminary modulation even when transmitting digital data. With this arrangement, the overall configuration of the bidirectional optical space transmission system can be greatly simplified. Additionally, since the signal level of the auxiliary signal (pilot signal) can be raised after the inverse spreading process, the automatic tracking ability can be improved.

Since a spreading code (a sequence of pseudonoises) is used for the purpose of demodulation with the spectral spreading system, the auxiliary signal (pilot signal) from the right partner optical transmission apparatus to be received can be discriminated from auxiliary signals coming from other optical transmission apparatus. Thus, if a plurality of optical transmission apparatus are arranged at the opposite ends of the transmission path, the partner optical transmission apparatus can be identified by using a sequence of pseudonoises that is different from any sequences of pseudonoises used in other optical transmission apparatus. Then, if the light receiving element 50 of the apparatus receives an optical signal from a wrong optical transmission apparatus located at the opposite end of the transmission path, the auxiliary signal (pilot signal) contained in the received optical signal is not demodulated because the sequence of pseudonoises multiplexed with the auxiliary signal (pilot signal) is different from any sequences of pseudonoises input to the spreading demodulator sections 54a through 54d from the pseudo noise generating section 56. As a result, the optical transmission apparatus would not track the auxiliary signal (pilot signal) transmitted from a wrong optical transmission apparatus located at the opposite end of the transmission path.

In this way, the optical transmission apparatus can correctly recognize the right partner optical transmission apparatus out of a plurality of optical transmission apparatus arranged at the opposite end of the transmission path and then correct the angular error, if any, of the optical axis of the light beam transmitted from the partner apparatus.

The present invention is by no means limited to the above described embodiments and can find various different applications. For example, the spectral spreading system is not limited to the above described direct spreading system and a frequency hopping system may be used equally effectively. The present invention encompasses any such applications without departing from the scope of invention as defined by the appended claims.

What is claimed is:

1. An optical transmission apparatus comprising:

a signal generating circuit for generating an auxiliary signal modulated for spectral spreading;

a multiplexing section for multiplexing the auxiliary signal generated by said signal generating circuit and a main signal;

an electrooptic converter section for emitting an optical signal on the basis of the signal produced by said multiplexing section as a result of the multiplexing;

a light receiving element for receiving an optical signal transmitted from a partner optical transmission apparatus and detecting an auxiliary signal contained in the optical signal and modulated for spectral spreading; and a demodulation circuit for spreading demodulation of the auxiliary signal detected by said light receiving element.

2. An optical transmission apparatus according to claim 1, wherein said signal generating circuit includes an auxiliary signal generating section for generating an auxiliary signal, a code generating section for generating a spreading code and a spreading modulator section for carrying out an operation of spectral spreading modulation on the auxiliary signal generated by the auxiliary signal generating section, using the spreading code generated by the code generating section.

3. An optical transmission apparatus according to claim 1, wherein
said electrooptic converter section includes a laser diode and a laser drive circuit for driving the laser diode according to the signal multiplexed by said multiplexing section.

4. An optical transmission apparatus according to claim 1, wherein
said demodulation circuit includes a synchronism detection circuit for detecting a synchronizing signal from the signal detected by said light receiving element, a code generating section for generating a spreading code in synchronism with the signal detected by the light receiving element on the basis of the synchronizing signal detected by the synchronism detection circuit and a spreading demodulator section for carrying out an operation of spreading demodulation on the auxiliary signal out of the signal detected by the light receiving element.

5. An optical transmission apparatus according to claim 4, further comprising:
a level detection circuit for detecting a reception level of the auxiliary signal subjected to spreading demodulation in the spreading demodulation section.

6. An optical transmission apparatus according to claim 4, further comprising:
an optical system for transmitting the light beam emitted by said electrooptic converter section toward another optical transmission apparatus and an analysing section for detecting an error, if any, in the angle of transmission of the optical signal emitted from the optical system on the basis of the auxiliary signal subjected to spreading demodulation in the spreading demodulator section.

7. An optical transmission apparatus according to claim 6, wherein
said light receiving element has a light receiving surface divided into four planes and said spreading demodulator section carries out an operation of spreading demodulation on the auxiliary signals out of the signals output from the respective light receiving planes of the surface of the light receiving element, while said analysing section detects an error, if any, in the angle of transmission of the optical signal on the basis of the auxiliary signals subjected to spreading demodulation.

8. An optical transmission apparatus according to claim 6, wherein
said optical system includes an angle modifying section for modifying the angle of transmission of the optical signal and a control section for controlling the angle modifying section on the basis of the error detected by said analysing section.

9. An optical transmission apparatus according to claim 1, further comprising:
a first beam splitter for isolating the optical signal transmitted from another optical transmission apparatus from the optical signal emitted from said electrooptic converter section and leading it to said light receiving element.

10. An optical transmission apparatus according to claim 9, further comprising:
a second beam splitter for isolating the optical signal isolated by said first beam splitter into an optical signal for detecting the main signal from an optical signal to be received by said light receiving element.

11. An optical transmission apparatus according to claim 10, further comprising:
an optoelectric converter section for converting the optical signal for detecting the main signal into an electric signal and a demodulator section for demodulating the electric signal obtained by the optoelectric converter section to recover the main signal.

12. A bidirectional optical space transmission system comprising a pair of optical transmission apparatus as in any of claims 1 through 11 and separated from each other by a predetermined distance.

* * * * *

UNITED STATES PATENT AND TRADEMARK OFFICE
CERTIFICATE OF CORRECTION

PATENT NO. : 6,616,352 B1
DATED : September 9, 2003
INVENTOR(S) : Shigeta et al.

It is certified that error appears in the above-identified patent and that said Letters Patent is hereby corrected as shown below:

Title page,
Item [*] Notice, "Subject to any disclaimer, the term of this patent is extended or adjusted under 35 U.S.C. 154(b) by 0 days." should read
-- Subject to any disclaimer, the term of this patent is extended or adjusted under 35 U.S.C. 154(b) by 511 days. --.

Column 5,
Line 11, "and" should read -- and are --.

Column 7,
Line 1, "currents" should read -- current. --

Column 12,
Line 37, "1 through 11 and" should read -- 1-11, in which the pair of optical transmission apparatus are --.

Signed and Sealed this

Twenty-fifth Day of January, 2005

JON W. DUDAS
*Director of the United States Patent and Trademark Office*